(12) United States Patent
Darut et al.

(10) Patent No.: US 7,325,559 B2
(45) Date of Patent: Feb. 5, 2008

(54) METHOD FOR CONNECTING A BRANCH PIPE TO A MAIN PIPELINE AND UNDERGROUND NETWORK FOR DISTRIBUTING FLUID

(75) Inventors: Alain Darut, Chatou (FR);
Jean-Michel Bideault, Meriel (FR);
Michel Hardy, Colombes (FR)

(73) Assignee: Gaz de France, Paris (FR)

( * ) Notice: Subject to any disclaimer, the term of this patent is extended or adjusted under 35 U.S.C. 154(b) by 295 days.

(21) Appl. No.: 11/106,519

(22) Filed: Apr. 15, 2005

(65) Prior Publication Data
US 2005/0242576 A1    Nov. 3, 2005

(30) Foreign Application Priority Data
Apr. 15, 2004    (FR) .................................. 04 03948

(51) Int. Cl.
*F16L 41/00* (2006.01)
(52) U.S. Cl. .................. 137/15.12; 137/317; 408/105; 405/184.1; 285/197
(58) Field of Classification Search ............. 405/184.1, 405/184.3, 154.1; 408/87, 104, 105; 285/23, 285/187; 137/317, 318, 15.12, 15.13
See application file for complete search history.

(56) References Cited

U.S. PATENT DOCUMENTS

| 4,431,017 A | 2/1984 | Willemsen |
| 4,647,073 A * | 3/1987 | Kosaka ........................ 137/318 |
| 4,832,069 A * | 5/1989 | Gale et al. ................... 137/318 |
| 5,842,496 A | 12/1998 | Delanty et al. |
| 6,142,165 A | 11/2000 | Wartel et al. |
| 7,018,137 B2 * | 3/2006 | Hutton et al. ............ 405/184.1 |

FOREIGN PATENT DOCUMENTS

CH            143456        11/1930

* cited by examiner

*Primary Examiner*—Kevin Lee
(74) *Attorney, Agent, or Firm*—Young & Thompson

(57) ABSTRACT

Method in which the following operations are carried out:
a) digging an exploration hole (8) in order to open up a main pipeline (2) which has an upper edge (10) which extends at an upper level (12) which is substantially constant relative to the ground (6),
b) using a branch connection (14) which has a support surface (16) and a shaft (18) to which the branch pipe is connected,
c) positioning the support surface (16) of the branch connection (14) against the main pipeline (2) so that the shaft (18) is below the upper level (12) of the main pipeline (2),
d) fixing the branch connection (14) to the main pipeline (2),
e) placing the branch pipe and the main pipeline (2) in communication,
f) refilling the exploration hole (8), whilst keeping the branch pipe below the upper level (12) of the main pipeline (2).

8 Claims, 2 Drawing Sheets

METHOD FOR CONNECTING A BRANCH PIPE TO A MAIN PIPELINE AND UNDERGROUND NETWORK FOR DISTRIBUTING FLUID

FIELD OF THE INVENTION

The invention relates to a method for connecting a branch pipe to a main pipeline and an underground network (or a network portion) for distributing fluid, such as gas or water.

BACKGROUND OF THE INVENTION

It is normal to arrange branch connections on main pipelines in which a fluid, such as in particular gas or water, circulates in order to supply a new residence.

The positioning of these branch connections comprises the following operations:
a) digging an exploration hole from the ground in order to open up a portion of the main pipeline which has an upper edge which extends at an upper level which is substantially constant relative to the ground,
b) using a branch connection which has a support surface in the form of a cylindrical portion and a shaft which extends substantially perpendicularly relative to the support surface to which the branch pipe is connected,
c) positioning the support surface of the branch connection against the main pipeline,
d) fixing the branch connection to the main pipeline,
e) placing the branch pipe and the main pipeline in communication,
f) refilling the exploration hole.

Document U.S. Pat. No 4,431,017 thus describes a branch connection which can be laterally positioned and which, in this assembly position, comprises a plug and the control device thereof which are directed upwards.

OBJECT OF THE INVENTION

The object of the invention is to limit the inconvenience caused by the exploration hole for the movement of pedestrians and vehicles, to facilitate the positioning of the branch connection, to reduce the duration thereof and finally to reduce the cost thereof.

SUMMARY OF THE INVENTION

In order to achieve this according to the invention, during step c), the shaft of the branch connection is positioned, with the branch thereof, entirely below said upper level of the main pipeline, or substantially at this level, and, during step f), the branch pipe is kept below the upper level of the main pipeline, or substantially at the upper level of the main pipeline relative to the ground.

In contrast to current practice, the positioning of the branch connection thus does not reduce the distance separating the ground from any element which is intended to allow the fluid to circulate (main pipeline, branch pipe, branch connection . . . ). Consequently, it is possible to raise the level of the pipelines relative to the ground and therefore to reduce the depth of the exploration hole, whilst complying with the safety regulations which impose a minimum distance between ground level and any element which is intended for the circulation of fluid. Since the hole is less deep, the production and the refilling thereof require less time and the quantity of earth to be stored in the vicinity of the hole for this period of time is smaller. Furthermore, since the pipeline is less deep, the positioning of the branch connection is thereby facilitated.

According to a complementary feature in accordance with the invention, a branch connection is used which has a branch which extends perpendicularly relative to the shaft, during step b), the branch pipe is connected to the branch and, during step c), the branch is positioned substantially parallel with the main pipeline.

The dimensions of the exploration hole are thus optimised and the positioning of the branch connection with no risk of leaks is facilitated.

In order to further improve the positioning of the branch connection according to the invention, the method has the following features:
a positioning device is used which comprises a support, means for fixing the branch connection to the support and means for pressing the support surface of the branch connection against the main pipeline,
during step c), the support is positioned from the ground and
during step d), the means for pressing the support surface of the branch connection against the main pipeline are operated from the ground.

The cross-section of the exploration hole can thus be reduced. The production and the refilling thereof will consequently take a shorter time.

The invention further relates to an underground network, or a portion of underground network, for distributing fluid, such as gas or water, said network comprising:
at least one main pipeline, said main pipeline having an upper edge which extends at an upper level which is substantially constant below the ground,
a plurality of branch connections which are fixed to the main pipeline and which each comprise a shaft which extends substantially perpendicularly relative to the main pipeline,
a plurality of branch pipes which extend in the ground, each branch pipe being connected to the main pipeline by means of one of the branch connections, for the circulation of fluid.

According to the invention, in order to overcome the above-mentioned problems, the shaft of each of the branch connections and each of the branch pipes are located entirely below said upper level of the main pipeline, or substantially at the upper level of the main pipeline relative to the ground.

In addition to the above-mentioned advantages, the positioning of the branch pipe and the shaft of the branch connection, whose resistance to an excavation tool (shovel or pickaxe in particular) is lower than that of the main pipeline, below the upper level of the main pipeline reduces the possible risk of damage if a new exploration hole should be made in the vicinity of the branch connection.

According to another advantageous feature in accordance with the invention, the upper level of the main pipeline extends at a distance from the ground of approximately between 40 centimeters and 50 centimeters.

The main pipeline, the branch connection and the branch pipe are thus arranged below a depth of soil which will protect them in an effective manner whilst not being too deep to be fairly readily accessible.

BRIEF DESCRIPTION OF THE DRAWINGS

The invention will be appreciated even more clearly from the following description, given with reference to the appended drawings, in which.

DETAILED DESCRIPTION OF THE INVENTION

Figure 1:
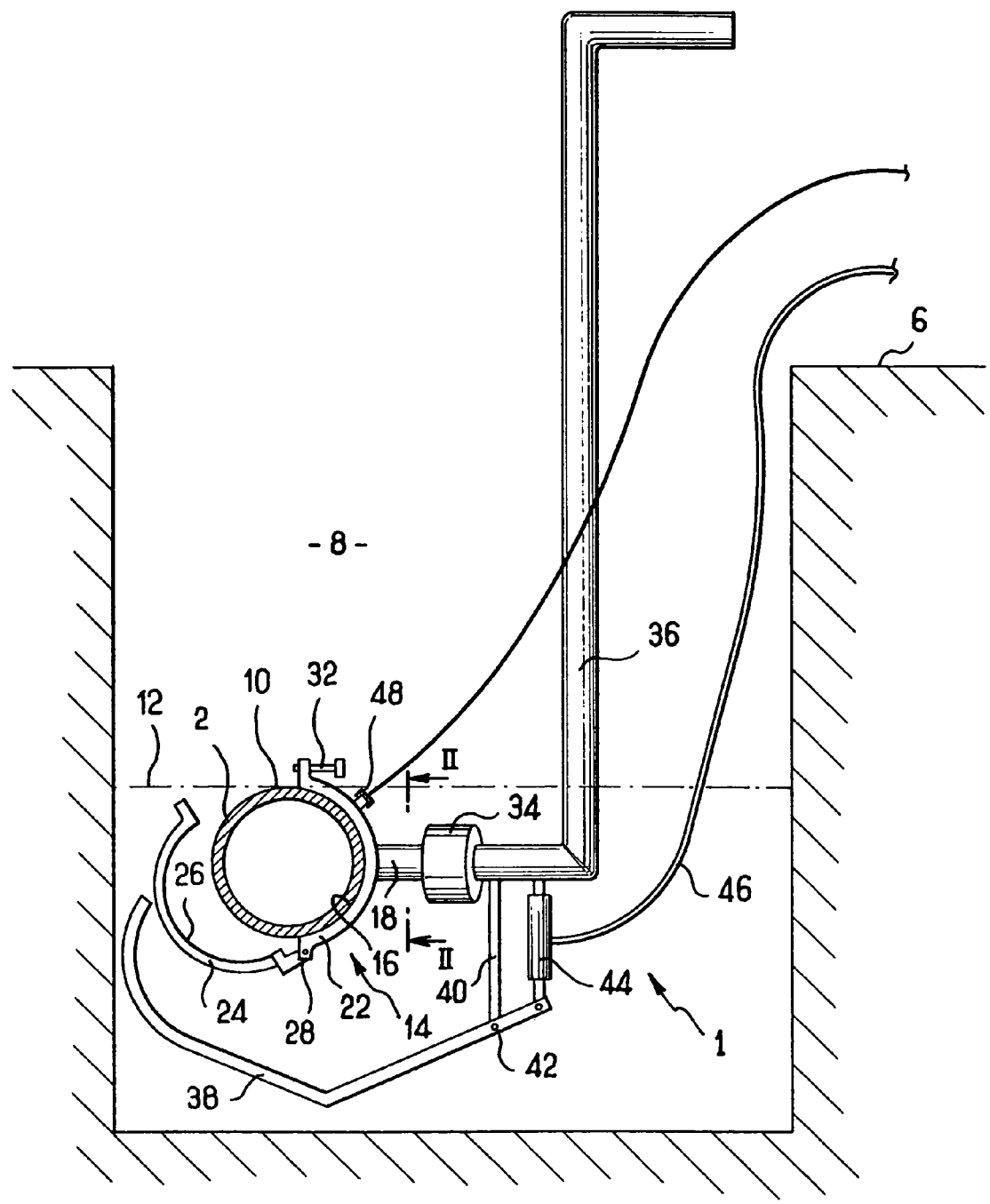
FIG. 1 is a schematic illustration of a first method step according to the invention.

The Figures illustrate a device 1 during the positioning of a branch connection 14 on a main pipeline 2.

The branch connection 14 substantially comprises a main plate 22 in which a shaft 18 and a branch 20 are integrated (visible only in FIG. 2), a fixing plate 24 and fixing screws 32. The main plate 22 has a substantially semi-cylindrical support surface 16 having a circular cross-section and an extension direction 30. In the same manner, the fixing plate 24 has a substantially semi-cylindrical support surface 26 having a circular cross-section which complements the support surface 16 of the main plate 22.

In the art in question, a shaft is a tubular portion whose axis perpendicularly intersects the axis of the pipeline and from which an axis branch extends which perpendicularly intersects that of the shaft.

The fixing plate 24 and the main plate 22 are connected to each other at one end of the support surfaces 16, 26, in this instance by means of an articulation 28 which rotates about an axis parallel with the extension direction 30, of the cap type.

The branch 20 is substantially tubular and extends substantially perpendicularly relative to the shaft 18 in which it opens. The shaft 18 is also substantially tubular. It extends perpendicularly relative to the extension direction 30 of the support surface 16 between the support surface 16 in which it opens and an end which is threaded at the outer side and to which an adaptor 34 is fixed which belongs to the positioning device 1.

In addition to the adaptor 34, the device 1 comprises a support 36, a foot 38 which is articulated so as to rotate relative to a rod 40, which is fixedly joined to the support 36, about an articulation axis 42 parallel with the extension direction 30 and means for displacing the foot 38 relative to the support 36 about the articulation axis 42. These means are constituted in this instance by a hydraulic or pneumatic jack 44. Other types of jack or other similar mechanical means could also be provided.

In order to connect a branch pipe 4 to the main pipeline 2, an exploration hole 8 is excavated from the ground 6 until a space is opened up around a portion of the main pipeline 2. The outer side of the portion of the main pipeline 2 is cleaned and scraped. The branch pipe 4 is connected to the branch 20 of the branch connection 14 and the branch connection 14 is fixed to the support 36 of the device 1. The jack 44 is operated in order to place the foot 38 in an open position, the fixing plate 24 moving against the foot 38 and being substantially spaced from the main plate 22.

The branch connection 14 which is connected to the branch pipe 4 is then lowered into the exploration hole 6, the shaft 18 of the branch connection 14 being substantially parallel with the ground 6. The support surface 16 of the main plate 22 is positioned against the main pipeline 2. Since the main pipeline 2 is substantially tubular, the extension direction 30 of the support surface 16 is brought into alignment with the extension axis 52 of the main pipeline 2.

Figure 2:
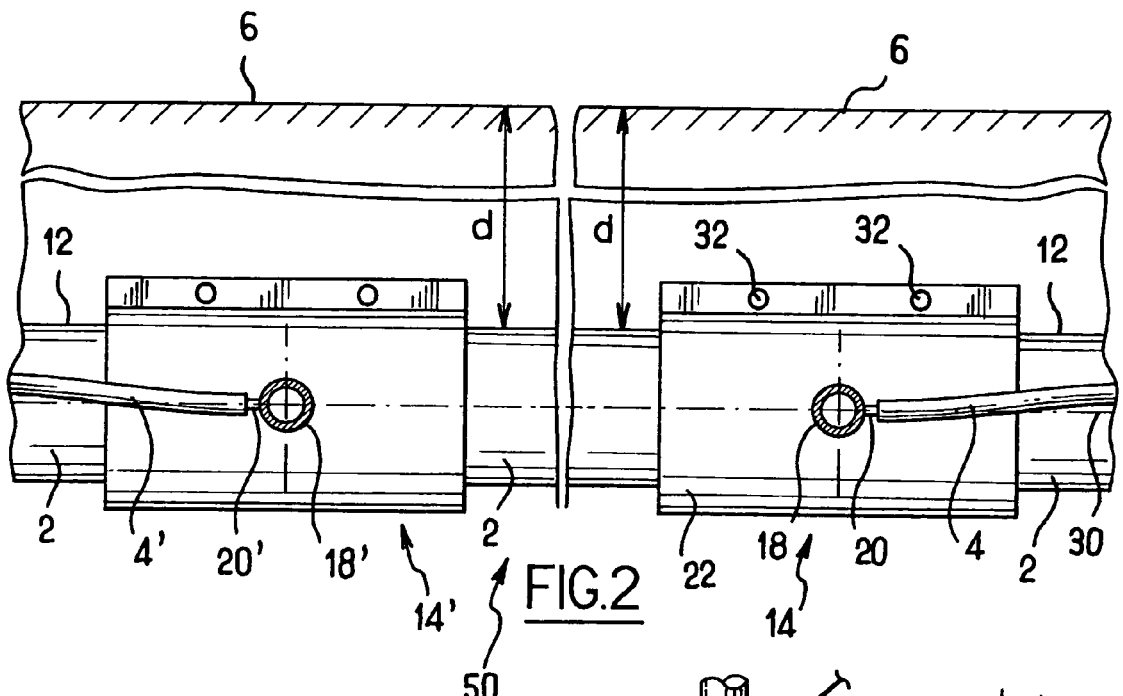
FIG. 2 is a sectioned view along line II-II in FIG. 1.
Figure 3:
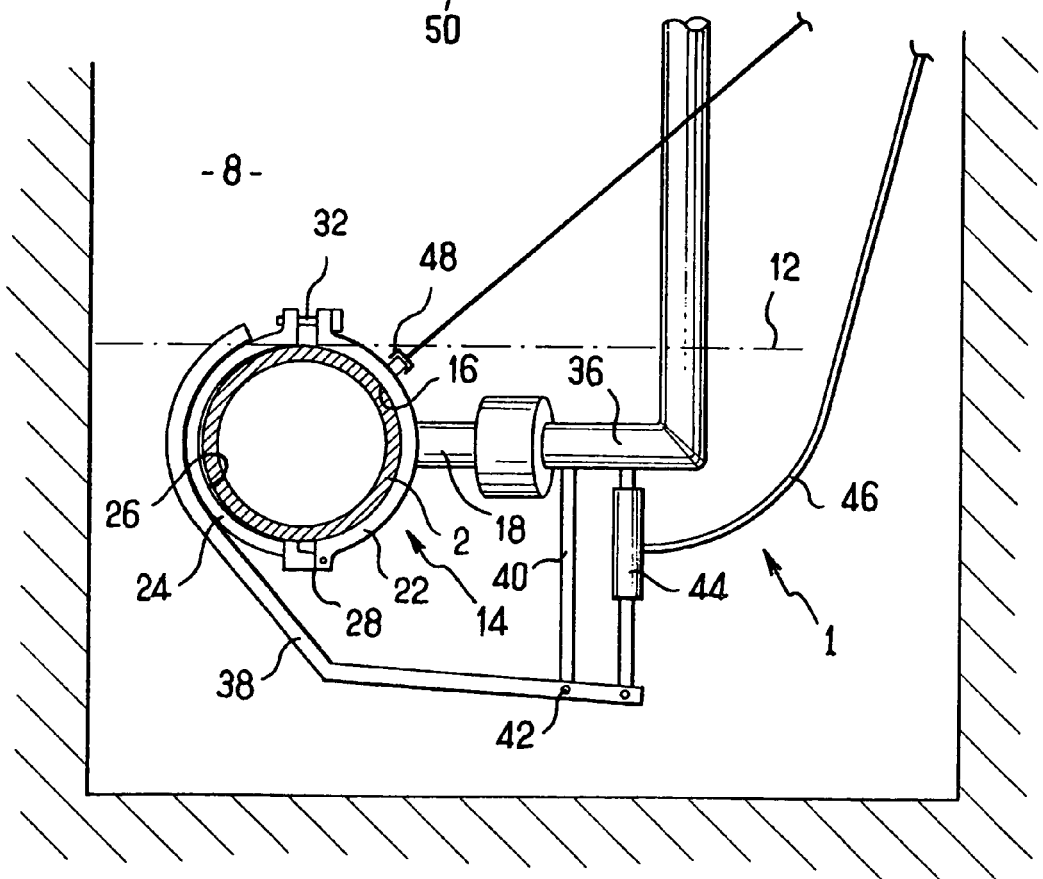
FIG. 3 is an illustration of a second method step.

As illustrated in FIG. 2, the branch 20 is positioned substantially parallel with the main pipeline 2 and the extension direction 30.

The main pipeline 2 has an upper edge 10 which extends at an upper level 12 and which is at a distance d which is substantially constant relative to the ground 6. Since the shaft 18 of the main pipeline is arranged in a substantially horizontal manner, it is located below this upper level 12, in the same manner as the branch 20.

Then, the jack 44 is operated from the ground 6 by means of supply means 46 connected to the jack 44. The foot 38 pivots about the articulation axis 42 and pushes the fixing plate 24 towards the main plate 22 by means of pivoting about the articulation 28 until the foot 38 reaches a closed position in which it presses the fixing plate 24 against the main pipeline 2.

The main plate 22 and the fixing plate 24 are then fixed, in this instance by means of screwing, at the side opposite the articulation 28 relative to the support surfaces 16, 26.

The main plate 22 is then welded by means of an electrical resistor connected to the electrical connectors 48. The electrical resistor is embedded in the main plate 22, close to the support surface 16.

The foot 38 is then brought into an open position and the device is separated from the main plate 22 by means of the adaptor 34.

The main pipeline 2 is finally drilled by a perforator which is integrated in the shaft 18 being moved with helical translation (screwing). The branch pipe 4 then communicates with the main pipeline 2 by means of the shaft 18.

The exploration hole 8 is then refilled, care being taken to ensure that the branch pipe is kept below the upper level 12 of the main pipeline 2.

By repeating the operation as many times as necessary, as illustrated in FIG. 2, a fluid distribution network 50 is produced, in particular for gas or water. In this-manner, a second branch connection 14' which is identical to the branch connection 14 and which comprises a shaft 18' and a branch 20' connects another branch pipe 4' to the main pipeline 2. The upper level 12 of the main pipeline 2 is also located substantially at distance d from the ground 6. The shaft 18' and the branch pipe both extend below the upper level 12. The shaft 18' extends substantially horizontally and substantially perpendicularly relative to the main pipeline 2 and, more precisely, to the extension axis 52 thereof. The branch pipe 4' extends substantially parallel with the extension axis 52 of the main pipeline 2 near the branch connection 14'.

The upper level 12 is advantageously arranged at a distance d below the ground 6 of between 40 centimeters and 50 centimeters.

In order to improve the legibility of the Figures, the thickness of the main pipeline 2, the main plate 22 and the fixing plate 24 have been enlarged. In reality, these thicknesses are generally between 1 and a few millimeters for main pipeline diameters which are generally between 40 millimeters and 250 millimeters.

The invention claimed is:

1. Method for connecting a branch pipe (4) to a main pipeline (2), in which the following operations are carried out:

a) digging an exploration hole (8) from the ground (6) in order to open up a portion of the main pipeline (2) which has an upper edge (10) which extends at an upper level (12) which is substantially constant relative to the ground (6), b) using a branch connection (14) which has a support surface (16) in the form of a cylindrical portion and a shaft (18) which extends substantially perpendicularly relative to the support surface (16) and which is provided with a branch (20) which is substantially perpendicular relative to the shaft (18) and to which the branch pipe (4) is connected, c) positioning the support surface (16) of the branch connection (14) against the main pipeline (2), d) fixing the branch connection (14) to the main pipeline (2), e) placing the branch pipe (4) and the main pipeline (2) in communication, f) refilling the exploration hole (8), characterised in that, during step c), the shaft (18) of the branch connection (14) is positioned, with the branch (20) thereof, entirely below said upper level (12) of the main pipeline (2), or substantially at the upper level (12) of the main pipeline (2) relative to the ground (6), and, during step f), the branch pipe (4) is kept below the upper level (12) of the main pipeline (2), or substantially at the upper level (12) of the main pipeline (2) relative to the ground (6).

2. Method according to claim 1, characterised in that:

during step b), the branch pipe (4) is connected to the branch (20), and during step c), the branch (20) is positioned substantially parallel with the main pipeline (2).

3. Method according to claim 1 characterised in that:

a positioning device (1) is used which comprises a support (36), means (34) for fixing the branch connection (14) to the support (36) and means for pressing the support surface (16) of the branch connection (14) against the main pipeline (2), during step c), the support (36) is positioned from the ground (6) and during step d), the means for pressing the support surface (16) of the branch connection (14) against the main pipeline (2) are operated from the ground (6).

4. Portion of an underground network (50) for distributing fluid, such as gas or water, said network portion comprising:

at least one main pipeline (2), said main pipeline (2) having an upper edge (10) which extends at an upper level (12) which is substantially constant below the ground (6), a plurality of branch connections (14, 14') which are fixed to the main pipeline (2) and which each comprise a shaft (18, 18') which extends substantially perpendicularly relative to the main pipeline, a plurality of branch pipes (4, 4') which extend in the ground (6), each branch pipe (4, 4') being connected to the main pipeline (2) by means of one of the branch connections (14, 14'), for the circulation of fluid, said network portion being characterised in that the shaft (18, 18') of each of the branch connections (14, 14') and each of the branch pipes (4, 4') are located entirely below said upper level (12) of the main pipeline (2), or substantially at the upper level (12) of the main pipeline (2) relative to the ground (6).

5. Network portion according to claim 4, characterised in that the upper level (12) of the main pipeline (2) extends at a distance (d) from the ground (6) of between 40 centimeters and 50 centimeters.

6. Network portion according to claim 4, characterised in that the main pipeline (2) extends along an extension axis and the branch pipes (4, 4') extend substantially parallel with the extension axis of the main pipeline (2) near the branch connection (14, 14').

7. Network portion according to claim 5, characterised in that the main pipeline (2) extends along an extension axis and the branch pipes (4, 4') extend substantially parallel with the extension axis of the main pipeline (2) near the branch connection (14, 14').

8. Method according to claim 2, characterised in that:

a positioning device (1) is used which comprises a support (36), means (34) for fixing the branch connection (14) to the support (36) and means for pressing the support surface (16) of the branch connection (14) against the main pipeline (2), during step c), the support (36) is positioned from the ground (6) and during step d), the means for pressing the support surface (16) of the branch connection (14) against the main pipeline (2) are operated from the ground (6).

* * * * *